United States Patent
Joshi

(10) Patent No.: US 9,748,544 B2
(45) Date of Patent: Aug. 29, 2017

(54) SEPARATOR FOR ALKALI METAL ION BATTERY

(71) Applicant: Ceramatec, Inc., Salt Lake City, UT (US)

(72) Inventor: Ashok V. Joshi, Salt Lake City, UT (US)

(73) Assignee: CERAMATEC, INC., Salt Lake City, UT (US)

(*) Notice: Subject to any disclaimer, the term of this patent is extended or adjusted under 35 U.S.C. 154(b) by 379 days.

(21) Appl. No.: 14/539,435

(22) Filed: Nov. 12, 2014

(65) Prior Publication Data

US 2015/0132633 A1 May 14, 2015

Related U.S. Application Data

(60) Provisional application No. 61/903,261, filed on Nov. 12, 2013.

(51) Int. Cl.
  *H01M 2/16* (2006.01)
  *H01M 10/052* (2010.01)
  (Continued)

(52) U.S. Cl.
  CPC ....... *H01M 2/1646* (2013.01); *H01M 2/1653* (2013.01); *H01M 2/1686* (2013.01);
  (Continued)

(58) Field of Classification Search
  None
  See application file for complete search history.

(56) References Cited

U.S. PATENT DOCUMENTS

| 3,117,032 A | 1/1964 | Panzer |
| 3,849,200 A | 11/1974 | Charles et al. |

(Continued)

FOREIGN PATENT DOCUMENTS

| CN | 101707241 | * 5/2012 |
| EP | GB2182194 | 5/1987 |
| WO | WO-2005/038953 | 4/2005 |

OTHER PUBLICATIONS

Kanno, Masashi "Non-Final Rejection", Japanese Patent Application No. 2013-542120, (Sep. 1, 2015), 1-3.

(Continued)

*Primary Examiner* — Basia Ridley
*Assistant Examiner* — Heng Chan
(74) *Attorney, Agent, or Firm* — Paul S. Cha

(57) ABSTRACT

A separator for an alkali metal ion rechargeable battery includes a porous ceramic alkali ion conductive membrane which is inert to liquid alkali ion solution as well as anode and cathode materials. The porous ceramic separator is structurally self-supporting and maintains its structural integrity at high temperature. The ceramic separator may have a thickness of at least 200 μm and a porosity in the range from 20% to 70%. The separator may be in the form of a clad composite separator structure in which one or more layers of porous and inert ceramic or polymer membrane materials are clad to the alkali ion conductive membrane. The porous and inert alkali ion conductive ceramic membrane may comprise a NaSICON-type, LiSICON-type, or beta alumina material.

16 Claims, 4 Drawing Sheets

(51) Int. Cl.
  *H01M 10/0569* (2010.01)
  *H01M 10/0568* (2010.01)
(52) U.S. Cl.
  CPC ...... *H01M 10/052* (2013.01); *H01M 10/0568* (2013.01); *H01M 10/0569* (2013.01); *H01M 2300/0025* (2013.01)

(56) References Cited

U.S. PATENT DOCUMENTS

| | | | |
|---|---|---|---|
| 3,929,506 | A | 12/1975 | Gritzner et al. |
| 4,018,969 | A | 4/1977 | Fischer et al. |
| 4,182,797 | A | 1/1980 | Kondo et al. |
| 4,430,393 | A | 2/1984 | Bennett et al. |
| 4,774,156 | A | 9/1988 | Bones et al. |
| 4,828,939 | A | 5/1989 | Turley et al. |
| 4,937,155 | A | 6/1990 | Tokoi et al. |
| 5,427,873 | A | 6/1995 | Shuster |
| 5,516,598 | A | 5/1996 | Visco et al. |
| 5,525,442 | A | 6/1996 | Shuster |
| 2003/0108788 | A1 | 6/2003 | Miyoshi et al. |
| 2004/0197641 | A1 | 10/2004 | Visco et al. |
| 2005/0175903 | A1 | 8/2005 | Kim et al. |
| 2006/0141346 | A1 | 6/2006 | Gordon et al. |
| 2007/0072067 | A1 | 3/2007 | Symons et al. |
| 2007/0117026 | A1* | 5/2007 | Kumar ............... C03C 1/006 429/320 |
| 2007/0259235 | A1 | 11/2007 | Jacobson et al. |
| 2009/0061288 | A1 | 3/2009 | Gordon et al. |
| 2009/0134040 | A1 | 5/2009 | Gordon et al. |
| 2010/0068629 | A1 | 3/2010 | Gordon |
| 2010/0239893 | A1 | 9/2010 | Gordon et al. |
| 2012/0040274 | A1 | 2/2012 | Gordon |
| 2012/0141856 | A1 | 6/2012 | Gordon et al. |

OTHER PUBLICATIONS

Conley, Oi K., "Final Office Action", U.S. Appl. No. 13/307,123, (Nov. 13, 2015), 1-13.
Kanno, Masashi "Non Final Office Action (English Translation)", Japanese Patent Application No. 2013-542120, (Sep. 1, 2015), 1-5.
Conley, Oi, "Non Final Office Action", U.S. Appl. No. 13/307,123, Mar. 7, 2016, 1-15.
Kim, Yeon-Gyeong "PCT International Search Report", Int. App. No. PCT/US2009/056781, (Mar. 2, 2010), 1-4.
Kim, Yeon-Gyeong "PCT Written Opinion", Int. App. No. PCT/US2009/056781, (Mar. 2, 2010), 1-3.
Anthony, Julian "Non-Final Office Action", U.S. Appl. No. 12/558,363, (Jan. 5, 2012), 1-8.
Jang, Sung W., "International Search Report", PCT/US2011/046143 (Corresponding to U.S. Appl. No. 13/195,431), (Feb. 27, 2012), 1-3.
Jang, Sung W., "Written Opinion of the International Searching Authority", PCT/US2011/046143 (Corresponding to U.S. Appl. No. 13/195,431), (Feb. 27, 2012), 1-3.
Yang, Kyung S., "International Search Report", PCT App. No. PCT/US2011/062534 (Corresponding to U.S. Appl. No. 13/307,123), (Jul. 24, 2012), 1-3.
Yang, Kyung S., "Written Opinion of the International Searching Authority", PCT App. No. PCT/US2011/062534 (Corresponding to U.S. Appl. No. 13/307,123), (Jul. 24, 2012), 1-3.
Abraham, et al., "A Low Temperature Na—S Battery Incorporating a Soluble S Cathode", *ElectroChimica Acta*, 1978, vol. 23, Pergamon Press Ltd., (Jun. 1, 1978), 501-507.
Jarvi, Tommi "European Search Report", European Patent Application 11845080.8 (Corresponding to U.S. Appl. No. 13/307,123) (Mar. 17, 2015), 1-11.
Anthony, Julian "Notice of Allowance", U.S. Appl. No. 12/558,363, (Aug. 16, 2012), 1-8.
Douyette, Kenneth "Non Final Office Action", U.S. Appl. No. 13/195,431, (Jun. 11, 2013), 1-28.
Douyette, Kenneth "Final Office Action", U.S. Appl. No. 12/195,431, (Oct. 24, 2013), 1-19.
Douyette, Kenneth "Notice of Allowance", U.S. Appl. No. 13/195,431, (Mar. 13, 2014), 1-21.
Conley, Oi K., "Non-Final Office Action", U.S. Appl. No. 13/307,123, (Aug. 11, 2014), 1-24.
Conley, Oi K., "Final Office Action", U.S. Appl. No. 13/307,123, (Feb. 19, 2015), 1-9.
Conley, Oi K., "Non Final Office Action", U.S. Appl. No. 13/307,123, (Jun. 2, 2015), 1-11.
Conley, Oi , "Non Final Office Action", U.S. Appl. No. 13/307,123, Mar. 7, 2016, 1-15.
Conley, Oi K. , "Final Office Action", U.S. Appl. No. 13/307,123, Aug. 30, 2016, 1-7.
Conley, Oi K. , "Non-Final Office Action", U.S. Appl. No. 13/307,123, Dec. 28, 2016, 1-15.
Unknown, "Notice of Allowance", Japanese Patent Application No. 2013-542120, Oct. 25, 2016, 1-4.

* cited by examiner

SEPARATOR FOR ALKALI METAL ION BATTERY

CROSS-REFERENCE TO RELATED APPLICATION

This application claims the benefit of U.S. Provisional Patent Application No. 61/903,261, filed Nov. 12, 2013, entitled SEPARATOR FOR ALKALI METAL ION BATTERY. The foregoing application is incorporated by reference.

FIELD OF THE INVENTION

This invention relates to a separator material and construction for an alkali ion ($Na^+$, $Li^{30}$) rechargeable battery. The separator includes a porous ceramic alkali ionic conductor which is inert to liquid alkali ion solution as well as anode and cathode materials. The separator is structurally self-supporting and maintains its structural integrity at high temperature.

BACKGROUND OF THE INVENTION

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode (sometimes referred to as the cathode), while electrochemical oxidation occurs at the cell's negative electrode (sometimes referred to as the anode). While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on alkali metals (lithium and sodium) can comprise a variety of materials and designs, almost all cell designs electrode solutions in the cell are able to intermix over time and, thereby, cause a drop in Faradaic efficiency and loss of battery capacity. This is true of conventional lithium ion batteries that typically utilize a polymeric separator having a thickness of about 2 to 3 microns. Sometimes the polymeric separators are combined with a thin (less than 1 micron) ceramic coating.

The thin separator enables high current density applications, but lacks the self-supporting integrity to maintain separation of the chemical contents of the positive and negative electrodes in the event of separator failure. Separator failure is known to occur when the battery overheats and causes the polymeric separator to melt. Such separator failure has occurred with lithium ion batteries, causing catastrophic fire and explosion.

Thus, while alkali metal rechargeable batteries are available, challenges with such batteries also exist, including those mentioned above. Accordingly, it would be an improvement in the art to provide an alternative separator for alkali metal ion batteries that will provide enhanced battery safety.

BRIEF SUMMARY OF THE INVENTION

The presently disclosed invention relates to a separator for alkali metal ion rechargeable batteries. The separator includes a porous ceramic alkali ionic conductive membrane which is inert to liquid alkali ion solution as well as anode and cathode materials. The porous ceramic separator is structurally self-supporting and maintains its structural integrity at high temperature.

In one embodiment, the disclosed separator comprises a porous and inert alkali ion conductive ceramic membrane. The membrane has sufficient thickness to be structurally self-supporting and maintain its structural integrity at high temperature. The ceramic separator preferably has a thickness of at least 200 µm. The separator preferably has a porosity in the range from 20% to 70%. In one non-limiting embodiment, the separator is configured for use in a high power, high energy density alkali ion rechargeable battery.

The porous and inert alkali ion conductive ceramic membrane selectively transports alkali ions, such as lithium and sodium ions. The separator is stable at the cell's operating temperature; is stable when in contact with the liquid organic electrolyte solution; and otherwise allows the cell to function as intended. Indeed, in some non-limiting implementations, alkali ion conductive ceramic membrane comprises a NaSICON-type or LiSICON-type material, such as materials produced by Ceramatec, in Salt Lake City, Utah. In some cases alkali ion conductive beta alumina may be used.

In one non-limiting embodiment, the separator further comprising a layer of porous and inert ceramic membrane clad to at least one surface of the porous and inert alkali ion conductive ceramic membrane to form a clad composite separator structure. In another non-limiting embodiment, the separator includes a layer of porous and inert ceramic membrane clad to both surfaces of the porous and inert alkali ion conductive ceramic membrane to form a clad composite separator structure. The porous and inert ceramic membrane may be made of a variety of different ceramic materials, such as alumina, zirconia, silica, and CERCANAM® (CERCANAM is a registered trademark of Ceramatec, Inc.). As noted above, the porous and inert alkali ion conductive ceramic membrane may comprise a NaSICON-type, LiSICON-type, or beta alumina material.

In another non-limiting embodiment, the separator further comprises a layer of porous and inert polymer membrane clad to at least one surface of the porous and inert alkali ion conductive ceramic membrane to form a clad composite separator structure. In another non-limiting embodiment, the separator includes a layer of porous and inert polymer membrane clad to both surfaces of the porous and inert alkali ion conductive ceramic membrane to form a clad composite separator structure. The porous and inert polymer membrane may be made of a variety of different ceramic materials, such as polyethylene, polypropylene, polytetrafluoroethylene (PTFE), nylon and polyvinyl chloride. As noted above, the porous and inert alkali ion conductive ceramic membrane may comprise a NaSICON-type, LiSICON-type, or beta alumina material.

In another non-limiting embodiment, the separator further comprises a porous and inert polymer material encapsulating the porous and inert alkali ion conductive ceramic membrane. As noted above, the porous and inert polymer membrane may be made of a variety of different ceramic materials, such as polyethylene, polypropylene, polytetrafluoroethylene (PTFE), nylon and polyvinyl chloride. The porous and inert alkali ion conductive ceramic membrane may comprise a NaSICON-type, LiSICON-type, or beta alumina material.

The separator disclosed herein is particularly suitable for use in a high power, high energy density alkali ion battery. The battery includes an anode and an anode current collector, a cathode and a cathode current collector, with the separator disposed between the anode and the cathode. In one disclosed embodiment, the separator comprises a porous and inert alkali ion conductive ceramic membrane. The membrane has sufficient thickness to be structurally self-supporting and maintain its structural integrity at high temperature. The ceramic separator preferably has a thickness of at least 200 µm. The separator has a porosity in the range from 20% to 70%. A liquid electrolyte bathes the anode, cathode, and separator. In one embodiment, the liquid electrolyte comprises an organic carbonate and one or more complex alkali ion salts. The separator may be configured according to any of the separator embodiments disclosed herein.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium negative electrodes, positive electrode materials, liquid positive electrolyte solutions, sodium ion conductive electrolyte membrane, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

Figure 1:
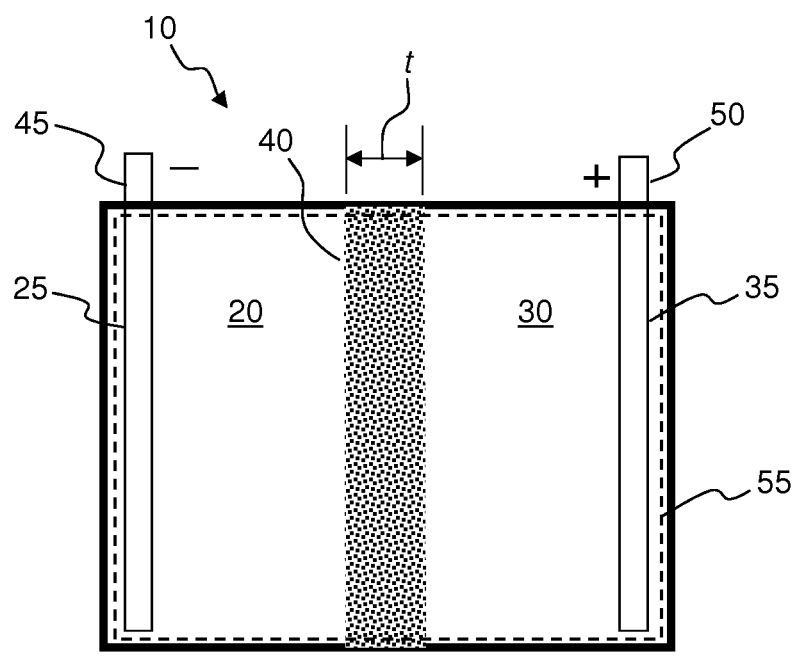
FIG. 1 shows a schematic representation of an alkali metal ion cell.

The disclosed invention provides a separator for an alkali metal ion rechargeable battery. While the described cell and its separator can comprise any suitable component, FIG. 1 shows a representative embodiment in which the alkali metal ion rechargeable battery 10 comprises an anode 20, an anode current collector 25, a cathode 30, and a cathode current collector 35. A porous and inert alkali ion conductive membrane 40 separates the anode 20 from the cathode 30. The alkali ion conductive membrane 40 separates a first terminal 45 from a second terminal 50.

In one embodiment the anode is carbon. It will be appreciated by those skilled in the art that depending upon a number of factors including anode selection, the anode current collector may be any number of materials. Non-limiting example of an anode current collector includes aluminum foil. The cathode may include one or more known cathode compounds, such as $MMnO_2$, $MCoO_2$, $MFeO_2$, $MCrO_2$, $MNiO_2$, $M_2TiO_3$, $MFePO_4$, and the like, where M is lithium or sodium. One non-limiting example of a cathode current collector is copper foil. As with the anode current collector, a number of suitable materials in various configurations may be used as a current collector.

The porous and inert alkali ion conductive membrane may comprise porous NaSICON, LiSICON, beta alumina, or beta double prime alumina material. The alkali ion may be sodium or lithium. It will be appreciated by those skilled in the art that selection of the alkali ion conductive membrane material will depend upon whether the organic electrolyte is lithium or sodium based and whether the cathode is a lithium or sodium material.

The disclosed separator, when used in an alkali metal ion rechargeable battery is preferably soaked with a liquid organic electrolyte solution that contains alkali ions, represented by the dashed box 55 in FIG. 1. The liquid alkali ion solution typically comprises one or more organic carbonates. Non-limiting examples of organic carbonates include diethyl carbonate, ethylene carbonate, and propylene carbonate. The organic carbonates preferably containing complex lithium or sodium salts. Non-limiting examples of suitable lithium or sodium salts include lithium or sodium hexafluoro phosphate ($LiPF_6$ or $NaPF_6$), lithium or sodium perchlorate ($LiClO_4$ or $NaClO_4$), and lithium or sodium tetrafluoro borate ($LiBF_4$ or $NaBF_4$).

The state of the art Li-ion battery cell uses a polymer separator such as porous polyethylene which presents a safety hazard under certain conditions, such as under shorting conditions. When the cell experiences shorting the temperature of the cell rises above the melting point of polyethylene and then causes anode and cathode to mix together causing the temperature to rise dramatically to cause fire and sometimes explosion. The presently disclosed invention uses a porous and inert alkali ion conductive ceramic membrane as the ion conducting media separator in conjunction with an organic liquid electrolyte. In addition, the ceramic membrane separator has a thickness t sufficient to be structurally self-supporting and maintain its structural integrity at high temperature. The membrane thickness t is at least 200 µm. Under this construction even if the cell is shorted externally, under no circumstances would the cathode and anode be directly exposed with each other under conditions that could cause fire or explosion.

There are several possible advantages of using porous alkali ion conductive ceramic membrane with liquid electrolyte in alkali metal ion rechargeable battery. These include: 1) safety, 2) higher temperature operation capability, 3) higher power density, 4) high energy density, 5) higher mechanical integrity, and 6) higher thermal shock resistance.

Using dense alkali ion solid electrolytes creates some disadvantages such as: 1) lower power density, 2) lower thermal shock resistance.

Figure 2:
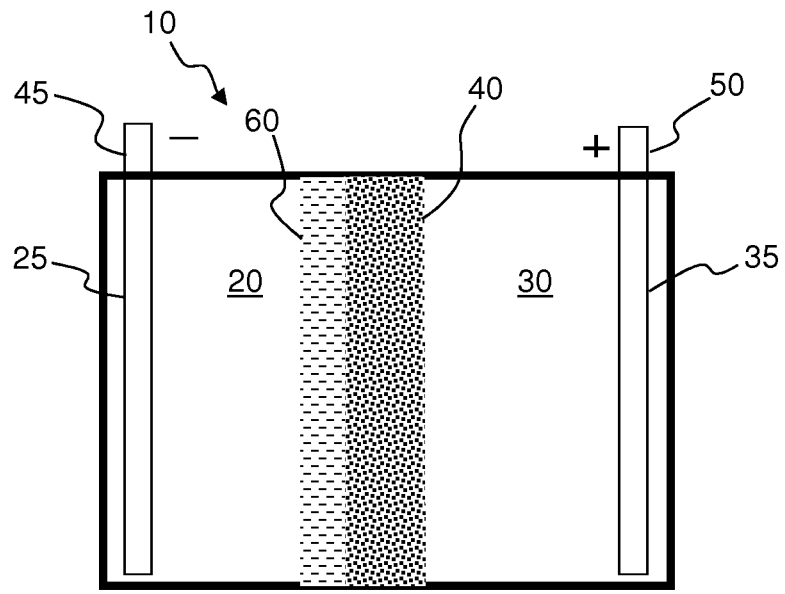
FIG. 2 shows a schematic representation of an alkali metal ion cell in which the separator contains a porous and inert alkali ion conductive ceramic material clad with a layer of porous and inert ceramic membrane.

FIG. 2 shows another embodiment of a separator for an alkali metal ion battery. The separator is a clad composite separator structure in which the porous and inert alkali ion conductive ceramic membrane 40 is the clad with a layer of porous and inert ceramic membrane 60. In this embodiment, the anode 20, cathode 30, separator 40 and current collectors 25, 35 may be the same as in the embodiment of FIG. 1. The entire cell is soaked in organic liquid electrolyte containing organic carbonate solution containing alkali ion salts. The layer of porous and inert ceramic membrane 60 may be positioned between the ion conductive separator and the anode. While not shown in FIG. 2, it is within the scope of the disclosed invention to have a layer of porous and inert ceramic membrane 60 clad to both sides of the porous and inert alkali ion conductive ceramic membrane 40.

Figure 3:
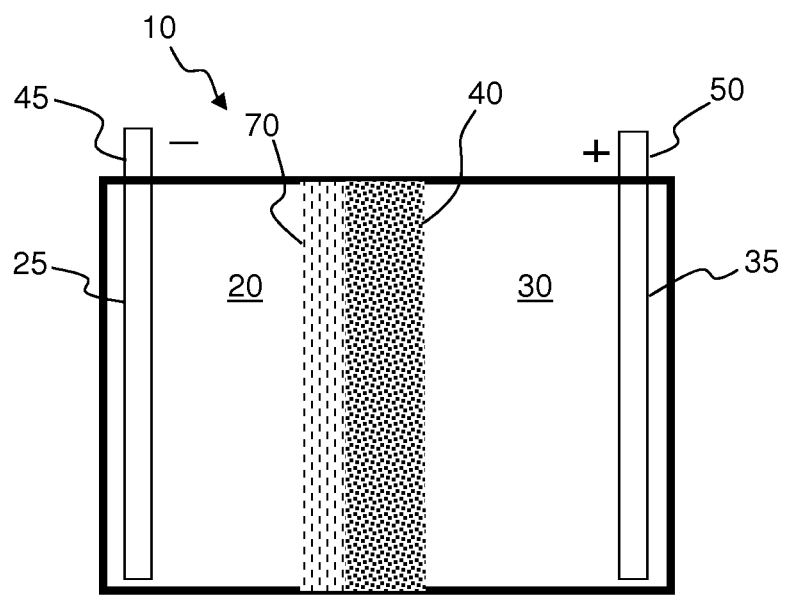
FIG. 3 shows a schematic representation of an alkali metal ion cell in which the separator contains a porous and inert alkali ion conductive ceramic material clad with a layer of porous and inert polymer membrane.

FIG. 3 shows another embodiment of a separator for an alkali metal ion battery within the scope of the present invention. The separator is clad composite separator structure in which the porous and inert alkali ion conductive ceramic membrane 40 is the clad with a layer of porous and inert polymer membrane 70 (e.g. polyethylene) that is inert to the anode 20, the organic liquid electrolyte solution, and the porous and inert alkali ion conductive ceramic membrane 40 (e.g. LiSICON, NaSICON, or beta alumina). The layer of porous and inert polymer membrane 70 may be positioned between the ion conductive separator and the anode. While not shown in FIG. 3, it is within the scope of the disclosed invention to have a layer of porous and inert polymer membrane 70 clad to both sides of the porous and inert alkali ion conductive ceramic membrane 40.

Figure 4A:
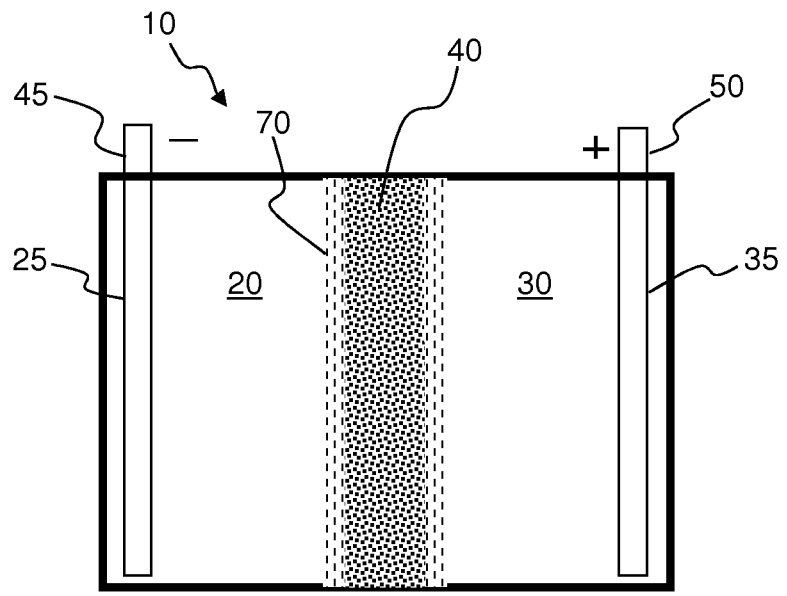
FIGS. 4A and 4B show schematic representations of an alkali metal ion cell in which the separator contains a porous and inert alkali ion conductive ceramic material and a porous and inert polymer material on both sides or encapsulating the porous and inert alkali ion conductive ceramic membrane.
Figure 4B:
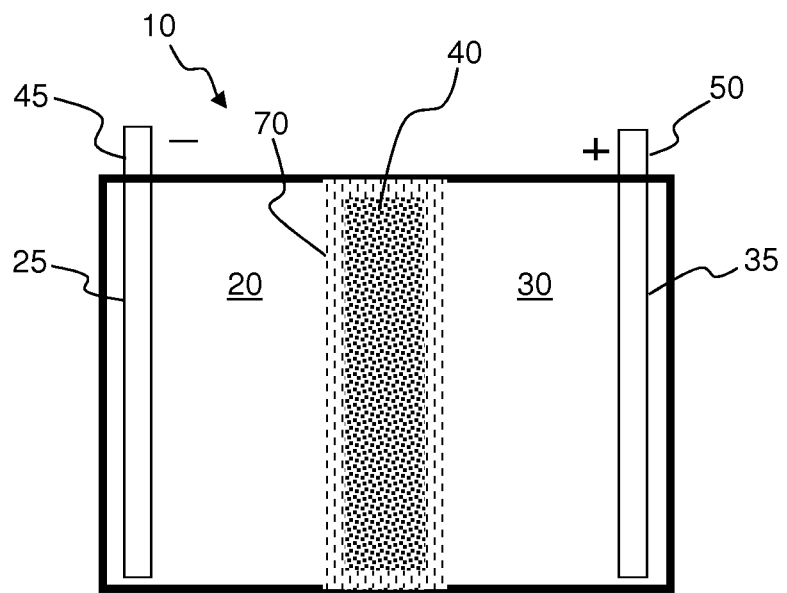

FIGS. 4A and 4B show a schematic representation of an alkali metal ion cell in which the separator contains a porous and inert alkali ion conductive ceramic membrane 40 and a porous and inert polymer material 70 encapsulating the porous and inert alkali ion conductive ceramic membrane 40. In this embodiment, the porous and inert alkali ion conducive ceramic membrane 40 is coated with porous and inert polymer 70. In the embodiment of FIG. 4A, the porous polymer 70 may be on both sides of the alkali ion conductive ceramic separator. The separator may be wholly or partially surrounded by the porous polymer 70 as shown in FIG. 4B. The whole cell is soaked in organic carbonate liquid electrolyte containing alkali ion salts.

Figure 5A:
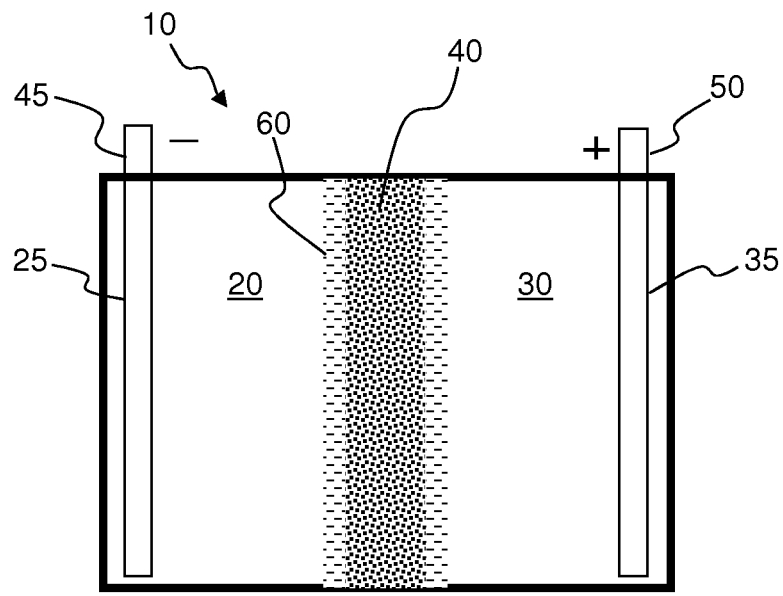
FIGS. 5A and 5B show a schematic representation of an alkali metal ion cell in which the separator contains a porous and inert alkali ion conductive ceramic material and a porous and inert ceramic membrane on both sides or encapsulating the porous and inert alkali ion conductive ceramic membrane.
Figure 5B:
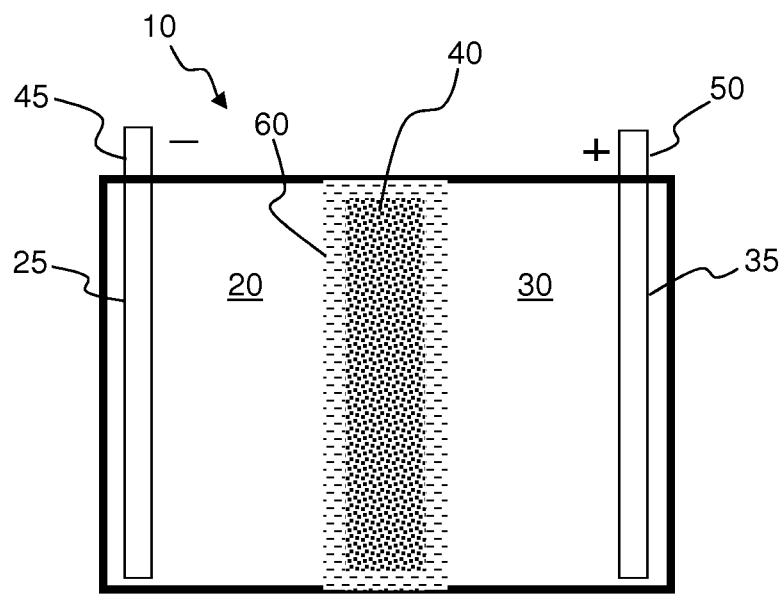

FIGS. 5A and 5B show a schematic representation of an alkali metal ion cell in which the separator contains a porous and inert alkali ion conductive ceramic membrane 40 and a porous and inert ceramic membrane 60 encapsulating the porous and inert alkali ion conductive ceramic membrane 40. In the embodiment of FIG. 5A, the porous and inert ceramic 60 may be on both sides of the alkali ion conductive ceramic membrane 40. The separator may be wholly or partially surrounded by the porous ceramic 60 as shown in FIG. 5B. The cell is soaked in organic carbonate liquid electrolyte containing alkali ion salts.

While specific embodiments and examples of the present invention have been illustrated and described, numerous modifications come to mind without significantly departing from the spirit of the invention, and the scope of protection is only limited by the scope of the accompanying claims.

The invention claimed is:

1. A separator for an alkali ion battery comprising a porous and inert alkali ion conductive ceramic membrane having a thickness of at least 200 µm, wherein the alkali ion conducting ceramic membrane has a porosity in the range from 20% to 70%, wherein the porous and inert alkali ion conductive ceramic membrane comprises a NaSICON, beta alumina, or LiSICON material.

2. The separator of claim 1, wherein the alkali ion battery comprises a lithium ion battery.

3. The separator of claim 1, further comprising a layer of porous and inert polymer membrane clad to at least one surface of the porous and inert alkali ion conductive ceramic membrane to form a clad composite separator structure.

4. The separator of claim 3, wherein the porous and inert polymer membrane comprises a polyethylene or polypropylene material.

5. The separator of claim 3, further comprising another layer of porous and inert polymer membrane clad to another surface of the porous and inert alkali ion conductive ceramic membrane to form a clad composite separator structure, wherein the layers of porous and inert polymer membrane are clad to both sides of the porous and inert alkali ion conductive ceramic membrane.

6. The separator of claim 1, further comprising a porous and inert polymer material encapsulating the porous and inert alkali ion conductive ceramic membrane.

7. The separator of claim 6, wherein the porous and inert polymer material comprises a polyethylene or polypropylene material.

8. A separator for an alkali ion battery comprising:
a porous and inert alkali ion conductive ceramic membrane having a thickness of at least 200 μm, wherein the alkali ion conducting ceramic membrane has a porosity in the range from 20% to 70%; and
a layer of porous and inert ceramic membrane clad to at least one surface of the porous and inert alkali ion conductive ceramic membrane to form a clad composite separator structure.

9. The separator of claim 8, wherein the porous and inert ceramic membrane comprises alumina.

10. The separator of claim 8, wherein the porous and inert alkali ion conductive ceramic membrane comprises a NaSICON, beta alumina, or LiSICON material.

11. The separator of claim 8, further comprising another layer of porous and inert ceramic membrane clad to another surface of the porous and inert alkali ion conductive ceramic membrane to form a clad composite separator structure, wherein the layers of porous and inert ceramic membrane are clad to both sides of the porous and inert alkali ion conductive ceramic membrane.

12. An alkali ion battery comprising:
an anode and an anode current collector;
a cathode and a cathode current collector;
a separator comprising a porous and inert alkali ion conductive ceramic membrane having a thickness of at least 200 μm, wherein the alkali ion conducting ceramic membrane has a porosity in the range from 20% to 70%, wherein the porous and inert alkali ion conductive ceramic membrane comprises a NaSICON, beta alumina, or LiSICON material; and
a liquid electrolyte bathing the anode, cathode, and separator comprising an organic carbonate and one or more complex alkali ion salts.

13. The battery of claim 12, wherein the alkali ion comprises lithium ion.

14. The battery of claim 12, wherein the separator further comprises a layer of porous and inert polymer membrane clad to at least one surface of the porous and inert alkali ion conductive ceramic membrane to form a clad composite separator structure.

15. The battery of claim 12, wherein the separator further comprises a porous and inert polymer material encapsulating the porous and inert alkali ion conductive ceramic membrane.

16. An alkali ion battery comprising:
an anode and an anode current collector;
a cathode and a cathode current collector;
a separator comprising a porous and inert alkali ion conductive ceramic membrane having a thickness of at least 200 μm, wherein the alkali ion conducting ceramic membrane has a porosity in the range from 20% to 70%, wherein the separator further comprises a layer of porous and inert ceramic membrane clad to at least one surface of the porous and inert alkali ion conductive ceramic membrane to form a clad composite separator structure; and
a liquid electrolyte bathing the anode, cathode, and separator comprising an organic carbonate and one or more complex alkali ion salts.

* * * * *